(12) United States Patent
Baune et al.

(10) Patent No.: US 7,972,667 B2
(45) Date of Patent: Jul. 5, 2011

(54) GAS CONTAINER PACKING STRUCTURE HAVING A MATERIAL CRYSTALLIZED IN NEEDLE FORM

(75) Inventors: Emmanuel Baune, Champagne S/Oise (FR); Pascal Del-Gallo, Dourdan (FR); Thierry Chartier, Feytiat (FR); Gilles Cannet, Parmain (FR)

(73) Assignee: L'Air Liquide Societe Anonyme pour l'Etude et l'Exploitation des Procedes G eorges Claude, Paris (FR)

( * ) Notice: Subject to any disclaimer, the term of this patent is extended or adjusted under 35 U.S.C. 154(b) by 891 days.

(21) Appl. No.: 11/828,098

(22) Filed: Jul. 25, 2007

(65) Prior Publication Data
US 2008/0090035 A1    Apr. 17, 2008

(30) Foreign Application Priority Data

Jul. 26, 2006    (FR) .................................... 06 53120

(51) Int. Cl.
*B65D 85/00* (2006.01)
*B01J 20/00* (2006.01)
*F17C 11/00* (2006.01)

(52) U.S. Cl. ....... 428/34.4; 428/34.5; 206/0.7; 502/407; 62/46.3

(58) Field of Classification Search ............... 428/34.1, 428/34.4, 34.5, 34.6, 34.7, 35.7, 35.8, 35.9, 428/36.1, 36.4, 36.5, 36.6, 36.7, 36.9, 36.91, 428/36.92, 356–362, 364–370, 372, 375, 428/378, 397, 398, 401; 206/0.7; 502/407; 62/46.3

See application file for complete search history.

(56) References Cited

U.S. PATENT DOCUMENTS

| 3,454,362 | A |   | 7/1969  | Spry |
| 3,928,539 | A |   | 12/1975 | Satoh et al. |
| 4,349,463 | A |   | 9/1982  | Flanigen |
| 4,349,643 | A |   | 9/1982  | Mohiuddin |
| 4,853,351 | A | * | 8/1989  | Takahashi et al. .............. 501/87 |
| 4,895,825 | A |   | 1/1990  | Deck et al. |

FOREIGN PATENT DOCUMENTS

| EP | 0 237 827   | 9/1987 |
| EP | 0 262 031   | 3/1988 |
| EP | 0 264 550   | 4/1988 |
| FR | 2 876 687   | 4/2006 |
| JP | 01 122917   | 5/1989 |
| JP | 2006 001992 | 1/2006 |
| WO | WO 93 16011 | 8/1993 |
| WO | WO 98 29682 | 7/1998 |

OTHER PUBLICATIONS

French Search Report for FR 0653120, May 14, 2007.
Database WPI Week 200024, Derwent Publications Ltd., London, GB, AN 2000-282937, & WO 00 12630, Mar. 9, 2000.

* cited by examiner

*Primary Examiner* — Walter B Aughenbaugh
(74) *Attorney, Agent, or Firm* — Allen E. White

(57) ABSTRACT

The present invention relates to a packing structure for containers, characterized in that it comprises a material of xonotlite and/or tobermorite and/or foshagite crystal structure crystallized in the form of needles, at least 50% by volume of which have a length ranging from 2 to 10 µm and a thickness ranging from 0.2 to 1 µm. Process for manufacturing such a packing structure and gas container containing it.

13 Claims, 4 Drawing Sheets

SEM micrograph of cylinder B (magnification: 6000)
Region adjacent to a glass fibre SEM micrograph of cylinder A (magnification : 2000)
Region remote from a glass fibre
-- Prior Art --

SEM micrograph of cylinder A (magnification : 8000)
Region remote from a glass fibre
-- Prior Art --

SEM micrograph of cylinder A (magnification : 6000)
Region adjacent to a glass fibre
-- Prior Art --

SEM micrograph of cylinder B (magnification : 2000)
Region remote from a glass fibre SEM micrograph of cylinder B (magnification: 8000)
Region remote from a glass fibre SEM micrograph of cylinder B (magnification: 6000)
Region adjacent to a glass fibre

GAS CONTAINER PACKING STRUCTURE HAVING A MATERIAL CRYSTALLIZED IN NEEDLE FORM

CROSS REFERENCE TO RELATED APPLICATIONS

This application claims the benefit of priority under 35 U.S.C. §119(a) and (b) to French Application No. FR 0653120, filed Jul. 26, 2006, the entire contents of which are incorporated herein by reference.

BACKGROUND

The subject of the present invention is novel packing structures for containers, containers containing them and their use for storing fluids, such as gases.

It is known to use pressurized containers containing gases, such as acetylene, dissolved in a solvent, such as acetone, for various medical and professional applications, and especially for carrying out welding, brazing and heating operations in combination with an oxygen cylinder.

These containers are usually packed with solid filling materials intended to stabilize the gases that they contain, which are thermodynamically unstable under the effect of pressure or temperature variations and therefore liable to decompose during their storage, their transport and/or their delivery.

These materials must have a sufficient porosity to facilitate the absorption and release of the gases contained in the container. They must also be incombustible and inert with respect to these gases, and must exhibit good mechanical strength. These materials conventionally consist of porous silicocalcareous ceramic masses, obtained for example from a homogeneous mixture in water of quicklime or lime water and silica (especially in the form of quartz flour), usually in a ratio of 0.6 to 1.1, as described in documents WO 93 16011, WO 98 29682, EP 0 262 031, in order to form a slurry which then undergoes a hydrothermal synthesis operation. Specifically, the slurry is introduced into the container to be packed, under partial vacuum, which then is autoclaved under pressure and temperature and then fired in a furnace in order to completely remove the water and form a monolithic solid mass of composition $Ca_xSi_yO_z \cdot wH_2O$ having crystal structures of the tobermorite and xonotlite type, possibly with residual quartz being present. Various additives may be added to these mixtures of the prior art to improve the dispersion of the lime and silica and thus avoid the formation of structural inhomogeneities and the shrinkage phenomena observed during hardening of the porous mass. The filling materials obtained must have a homogeneous porosity without free spaces in which pockets of gas could accumulate and run the risk of exploding.

The silicocalcareous porous masses of the prior art have in general a pore size of 25 µm or less, for example ranging from 0.05 to 25 µm, and a porosity of at least 85% and ranging to 93% by volume, so as to facilitate contact between the gas and the solvent and the packing, such as the draining of the gas contained in the containers. Document EP 0 264 550 furthermore indicates that a porous mass containing at least 50%, or at least 65% or even at least 75% by weight of crystalline phase (relative to the weight of calcium silicate) makes it possible to meet the twin requirements of compressive strength and shrinkage resistance at the hydrothermal synthesis and firing temperatures.

Although the known porous masses are generally satisfactory from their mechanical strength standpoint, the fact remains that the properties governing the withdrawal of the gases trapped in these porous masses have hitherto been insufficient.

This is because, depending on the operating conditions (use temperature, working rate, quantity of gas contained in the cylinder, etc.), said porous masses do not always make it possible for the gas that they contain to be continuously withdrawn at a high flow rate throughout the time needed for certain applications, especially for welding, with a maximum gas recovery ratio, corresponding to the ratio of the quantity of gas that can be used to the quantity of gas initially stored. Now, it would be desirable to be able to provide a flow rate of 200 l/h continuously for 15 min with a peak flow rate of 400 l/h for 4 min, for a gas capacity greater than or equal to 50% at the start of the trial (defined as the ratio of the quantity of gas present at this instant to the quantity of gas initially contained in the container), the container having a diameter/length ratio between 0.2 and 0.7, preferably between 0.35 and 0.5, for a minimum water capacity of one liter and preferably between 3 and 10 liters.

This insufficiency is particularly due to the heat loss associated with extracting the gas from the solvent, which may prove to be highly prejudicial to withdrawal of the gas. In the case of an acetylene cylinder for example, the energy consumption is around 600 joules per gram of acetylene extracted from the solvent. In practice, this results in substantial cooling of the cylinder upon withdrawal, leading to greater dissolution of the acetylene in the solvent and thus a pressure drop that affects the withdrawal flow rate. The flow finally becomes exhausted when the pressure at the cylinder outlet falls below atmospheric pressure.

The abovementioned effect is particularly exacerbated under certain low-temperature conditions, for example in winter or in cold-climate regions, and under conditions relating to high working rate, long withdrawal time (the final temperature of the cylinder possibly being 40° C. below its initial temperature upon prolonged withdrawal), container volume and quantity of gas stored.

Furthermore, the temperature and pressure variations are not uniform within the container which may result in the generation of mechanical stresses liable to degrade the porous mass over the course of time.

Added to the withdrawal difficulties are therefore mechanical strength problems liable to have repercussions on safety.

The present invention makes it possible to overcome these drawbacks of the prior art by using a specific porous structure (in terms of pore volume, shape and size distribution of the pores, tortuosity, uniformity) and intercrystallite links or bridges that may be obtained by controlling the various steps of the process, proceeding from the raw material up to the final firing, passing through the lime/silica mixing and the hydrothermal synthesis leading to crystallites defined below.

In other words, the Applicant has now shown that these problems and drawbacks can be overcome by using a container packing structure in the form of crystallites having a particular morphology and a particular size. They have also developed the process for obtaining these crystallites.

Thus, one subject of the present invention is a porous packing structure for containers, characterized in that it comprises a material of xonotlite and/or tobermorite and/or foshagite crystal structure crystallized in the form of needles (or acicular grains), at least 50% by volume of which have a length ranging from 2 to 10 µm and a thickness ranging from 0.2 to 1 µm.

These needles preferably have a length ranging from 2 to 5 µm and/or a thickness ranging from 0.2 to 0.5 µm. They will be denoted in the rest of this description by the term "thick needles".

The remaining fraction of needles, which represents less than 50% by volume of the material, preferably consists of needles having a length ranging from 0.5 to less than 2 µm and a thickness ranging from 0.01 to less than 0.2 µm. These needles will be denoted in the rest of this description by the term "thin needles".

Preferably, the packing structure according to the invention comprises at least 70% by weight, more preferably at least 80% by weight and even at least 90% by weight of material of xonotlite and/or tobermorite and/or foshagite crystal structure.

As will be apparent from the experimental part of this application, by using a packing structure crystallized in the form of a stack of mutually entangled needles, as defined above, and physically linked together by "solid bridges", it is possible for the structure to have the required properties for stabilizing the solvent in which the gas is dissolved and for its decomposition to be limited, by confining it in a multitude of microscopic spaces, thus ensuring safety of the containers and their regulatory conformity to the standardized tests, such as the ISO 3807-1 standard.

Above all, the microscopic spaces or pores provided between the crystallites have a configuration, that is to say a shape, facilitating the introduction of the fluid into the container (and therefore the filling of the container in the filling unit) and the extraction of the fluid from the container, thus making it possible to achieve the desired withdrawal flow rate. Preferably, these spaces constitute, between the needles, which are linked together, pores having a pore diameter of $D_{95}$ (diameter at which 95% by volume of the pores have a smaller diameter) greater than or equal to 0.4 µm but less than 5 µm. Furthermore, the packing structure preferably has pores having a mean pore diameter $D_{50}$ (diameter at which 50% by volume of the pores have a smaller diameter) greater than or equal to 0.4 µm but less than 1.5 µm. Finally, the structure advantageously has a total open porosity of between 80% and 90%. All these values may be measured by mercury porosimetry.

Apart from the acicular material described above, the packing structure according to the invention may include fibers chosen from carbon-based synthetic fibers, such as those described for example in document U.S. Pat. No. 3,454,362, alkaline-resistant glass fibers, such as those described for example in document U.S. Pat. No. 4,349,643, partially delignified cellulose fibers, such as those described for example in document EP 0 262 031, and mixtures thereof, without this list being exhaustive. These fibers are especially useful as reinforcing materials, to improve the impact strength of the packing structure, and they also make it possible to avoid cracking problems when the structure dries. These fibers may be used as such or after their surface has been treated.

The packing structure may furthermore include dispersing agents and/or binders, such as cellulose derivatives, in particular carboxymethylcellulose, hydroxypropylcellulose, or ethylhydroxyethylcellulose, polyethers, such as polyethylene glycol, synthetic clays of the smectite type, amorphous silica advantageously having a specific surface area of between 150 and 300 m$^2$/g, and mixtures therefore, without this list being exhaustive. Preferably, the packing structure contains fibers, particularly carbon fibers and/or glass fibers and/or cellulose fibers. The quantity of fibers is advantageously less than 55% by weight relative to all of the solid precursors used in the process for manufacturing the packing structure. Preferably, this quantity is between 3 and 20% by weight.

The packing structure according to the invention preferably has a compressive strength equal to or greater than 15 kg/cm$^2$, i.e. 1.5 MPa, more preferably greater than 20 kg/m$^2$, i.e. 2 MPa. The compressive strength may be measured by taking a cube measuring 100×100 mm$^2$ from the packing structure and applying a compressive force on the top face of said cube while it is being held against a horizontal metal plate. This force corresponds to the pressure (in kg/cm$^2$ or MPa) above which the material starts to crack.

Within this context, and to achieve the specific porous structure described above, another subject of the present invention is a process for manufacturing the packing structure leading to the desired crystallization and comprising the following successive steps:

limestone blocks such that at least 90% by weight have dimensions of 1 to 15 mm, said limestone having a purity of at least 92% by weight and an open porosity ranging from 0 to 25%, are calcined at a temperature of at least 850° C. for at least one hour in order to obtain quicklime particles;

said particles are mixed, in aqueous medium, with silica and optionally with other compounds, in order to obtain a slurry;

said slurry undergoes a hydrothermal synthesis operation at a temperature ranging from about 170 to 300° C., preferably of at least 180° C., advantageously of at least 185° C., in order to obtain a ceramic mass; and said ceramic mass is dried at a temperature of 300 to 450° C. for a time of 40 to 200 hours.

Of course, this process may include steps other than those mentioned above, which may be preliminary steps, intermediate steps or steps additional to those above.

In its first step, the process according to the invention employs limestone blocks measuring from 0.1 to 15 mm and preferably from 1 to 12 mm. The aggregates of such a size are generally obtained by various steps involving the crushing of quarried stone in a crusher having variably spaced jaws and screening of the stone fragments on screens in order to obtain aggregates with the desired dimensions. It has been determined that these values enable said blocks to be calcined right to the core under relatively simple conditions and to obtain, after calcination, a lime particle size ranging from 0.1 to 15 mm, guaranteeing that the lime has the proper reactivity during implementation of the second step of the process (the reactivity being measured in accordance with the NF EN 459-2 standard), without excessive risk of hydration and/or carbonation which could result from the way in which the lime is stored after calcination and which, in fine, could affect the quality of the packing structure. These blocks may be obtained by crushing larger limestone blocks. They have a purity ($CaCO_3$ content relative to the total weight of limestone) of at least 92% by weight and preferably at least 95% by weight or even at least 97% by weight, which limits the presence of impurities liable to affect the hydrothermal synthesis of the material crystallized in needle form. The limestone used according to the process of the invention thus preferably contains less than 6% by weight of silica and magnesium carbonate and less than 1% by weight of alumina, iron oxide, manganese oxide and other oxides, especially potassium, sodium and titanium oxides, and impurities such as sulphur or phosphorus. Finally, the open porosity of the limestone ranges from 0 to 25% and is preferably between 5 and 25%, determined by mercury porosimetry, so as to make it possible both for the water to correctly impregnate the lime that will be formed (for slaking it) and for the carbon dioxide to escape during formation of the lime by calcination of the limestone.

A person skilled in the art will be able to identify the worked quarries or veins allowing the aforementioned limestone blocks to be obtained.

The temperature, duration, and atmosphere conditions employed in this step furthermore allow the limestone to be completely calcined without causing sintering (densification) of the elementary particles, which would have the effect of closing the porosity and therefore reducing the reactivity of the lime obtained. In particular, it has been observed that, for a fixed hold time of two hours, the temperature should not be below 800° C. nor above 1100° C. Furthermore, if the calcination temperature is set at 1100° C., the hold time should not be substantially longer than one hour. It will therefore be understood that a person skilled in the art may adjust the limestone firing time and temperature to a certain extent, provided that the temperature is above 850° C. for at least one hour. An adjustment may in fact be necessary depending on the particular type of kiln, on the quantity of limestone treated, and on the arrangement (such as the layer thickness) of the product in the kiln. A temperature of about 900° C. for about three hours is preferred. At this temperature, it has been observed that the rate of sintering is relatively slow and that the hold time has only a slight impact on the reactivity. Firing at this temperature therefore makes it possible to adjust the calcination time to industrial constraints.

The first step of the process according to the invention thus makes it possible to obtain a quicklime having a satisfactory reactivity and capable of forming, after hydrothermal synthesis, the desired acicular material. Preferably, the quicklime obtained has a total water and carbon dioxide content of less than 2% by weight.

In the second step of the process according to the invention, the quicklime obtained after the first step is mixed with silica. This may be amorphous silica or crystalline silica and is preferably such that its purity is at least 90% (weight content of $SiO_2$) and such that it contains at least 90% by weight of elementary particles smaller than 1 μm, so that its reactivity with lime is as high as possible. Silicas of this type are commonly available commercially.

The lime and the silica are preferably mixed together in a $CaO/SiO_2$ molar ratio of 0.8 to 1. Furthermore, the water/solid precursors (lime+silica) ratio is preferably between 2 and 60, more preferably between 3 and 25.

It may also be useful to add a dispersant to the mixture in order to improve its uniformity. A lubricant such as a polyoxyethylene may also be provided.

The third step of the process according to the invention consists in subjecting the mixture (or "slurry") resulting from the second step to a hydrothermal synthesis operation at a temperature of between about 170 and 300° C., preferably between 180 to 190 and 250° C., for a time ranging, depending on the volume of the container to be packed, from 10 h to 70 h, for example around 40 hours for a container having a water volume of 6 liters. According to a first method of implementation, the synthesis may be carried out by introducing the slurry into the open container that it is intended to pack, then in placing the latter in an autoclave furnace subjected to a pressure of between $5 \times 10^5$ Pa and $25 \times 10^5$ Pa (5 and 25 bar), preferably between $7 \times 10^5$ Pa and $15 \times 10^5$ Pa (7 and 15 bar). According to a second method of implementation, the hydrothermal synthesis may be carried out by placing the slurry in the container that it is intended to pack, closing the latter with a plug equipped with a pressure-regulating system (such as a valve), pressurizing the container to a pressure ranging from atmospheric pressure to $25 \times 10^5$ Pa (25 bar), preferably between $7 \times 10^5$ Pa and $15 \times 10^5$ Pa (7 and 15 bar), and then placing this container in an unpressurized furnace. The pressure does not depend on the type of container used but does depend on the temperature at which the synthesis is carried out, for example about 14 bar at 196° C., 9 bar at 170° C., 34 bar at 240° C., etc. By fixing the temperature, it is therefore known in advance what pressure will be obtained.

The fourth step of the process, or drying step, has the function not only of removing residual water but also of giving the treated mass a predominantly crystal structure. This operation is carried out in a conventional electric furnace (which may or may not be the same as that used for the hydrothermal synthesis operation), at atmospheric pressure, that is to say after the plugs and valves have been removed from the top of the containers after hydrothermal synthesis in the second example of hydrothermal synthesis described above.

Another subject of the invention is a container including a packing structure as described above, which container is capable of containing and delivering a fluid.

The container usually comprises a metal shell containing the packing structure described above. The metal shell may consist of a metallic material such as steel, for example P265NB-standardized carbon steel according to the NF EN10120 standard, the thickness of which enables it to withstand at least the hydrothermal synthesis pressure without risk of an accident and to withstand a proof pressure of 60 bar (6 MPa), the regulatory normative value for filling containers with acetylene under the conditions described above. The container is also usually of cylindrical shape and generally provided with closure means and with a pressure regulator. This container preferably has a diameter/length ratio of between 0.2 and 0.7, more preferably between 0.35 and 0.5, and a minimum water capacity of one liter. Usually, such a container is in the form of a cylinder.

The fluids stored in the packing structure according to the invention may be gases or liquids.

As gas, mention may be made of pure compressed gases or mixtures in gaseous or liquid form, such as hydrogen, gaseous hydrocarbons (alkanes, alkynes and alkenes), nitrogen and acetylene, and gases dissolved in a solvent, such as acetylene and acetylene/ethylene or acetylene/ethylene/propylene mixtures, dissolved in a solvent such as acetone or dimethylformamide (DMF).

As liquids, mention may in particular be made of organometallic precursors such as Ga and In precursors used in particular in electronics, and also nitroglycerine.

In particular, the container according to the invention contains acetylene dissolved in DMF or acetone.

The invention will now be described in greater detail with reference to the following examples, which are given purely by way of illustration and implying no limitation, and to the appended figures in which.

EXAMPLES

Example 1

Figure 1:
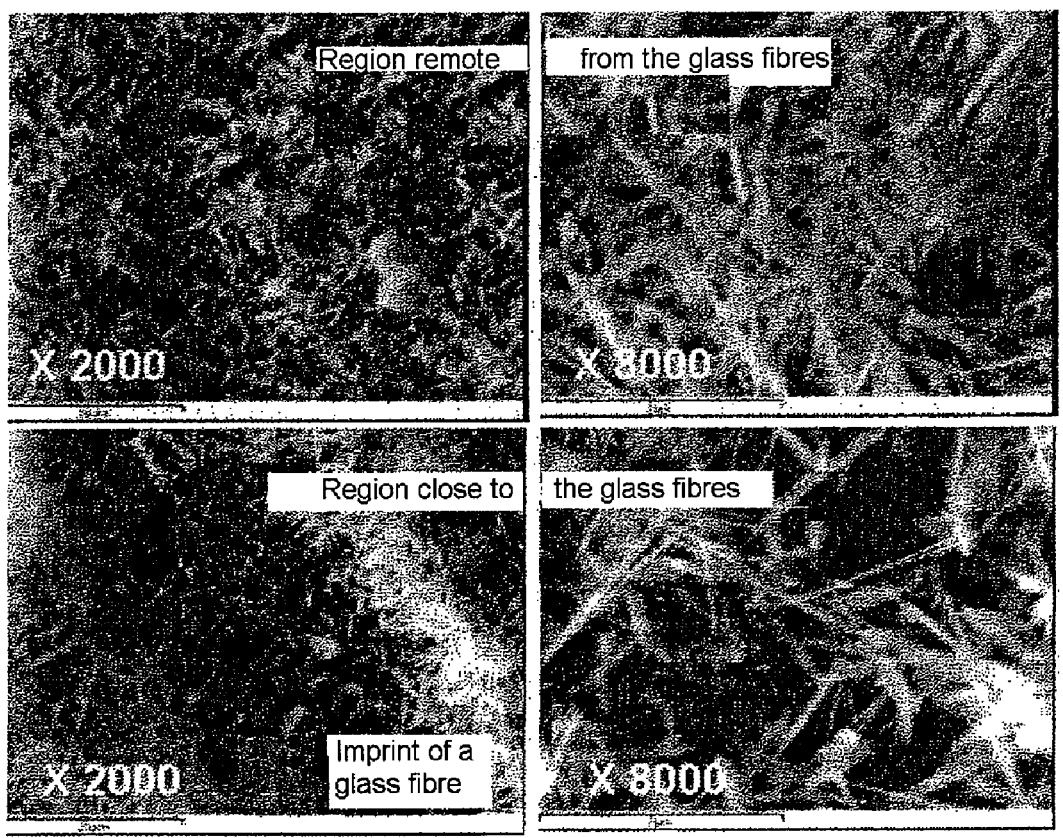
FIG. 1 illustrates the acicular appearance of the packing structure according to the invention.

Preparation of a Packing Structure According to the Invention

1A. Limestone Calcination
A limestone having the following characteristics was used:

Composition (by weight): 97.50% $CaCO_3$; 1.00% $MgCO_3$; 0.8%
$SiO_2$; 0.16% $Al_2O_3$; 0.5% $Fe_2O_3$;
Particle size: 5 to 10 mm;
Porosity: 18.9%;
$D_{50}$: 0.93 μm About 40 kg of this limestone were spread out on four hearths each supporting 10 kg of this product, with a thickness of 3 cm, and then calcined in an electric furnace under a dry air atmosphere, set at a rate of temperature rise of 5° C./min up to 900° C., and then held at this temperature for 5 h. Ventilation was in operation during both the temperature rise and the hold, then stopped during cooling, which was of the non-forced type.

1B. Slurry Preparation

The quicklime obtained in step 1A was slaked using hot water (at 43° C.), and then mixed with water with various adjuvants, in order to obtain the slurry having the composition indicated in Table 1 below.

TABLE 1

Composition of the Slurry

| Constituent | Quantity |
|---|---|
| CaO | 172 g |
| Water at 43° C. | 800 g |
| Water at 20° C. | 458 g |
| Phosphoric acid | 4 g |
| Polyoxyethylene | 0.018 g |
| Micron-scale silica | 180 g |
| Glass fiber | 24.6 g |

1C. Hydrothermal Synthesis and Drying

The slurry obtained in step 1B was injected into unpressurized steel cylinders having a water capacity of 5.8 liters, a total height of 485 mm, an outside diameter of 140 mm and an inside diameter of 136 mm, with care taken to ensure that any bubbles within the slurry were removed from the containers during and after filling. The cylinders were under a low vacuum during filling. Once filled, the cylinders were closed using valves, the opening of which was set at 1.4 MPa, then placed in a furnace where they were heated at a set temperature of 196° C. for 50 h, under an average pressure of 14 bar (1.4 MPa) over the duration of the hydrothermal synthesis.

The cylinders were then dried in a second furnace, after having removed the plugs and valves, at a set temperature of 370° C. and at atmospheric pressure for 100 h.

It was confirmed that the packed cylinders thus obtained met the normative and regulatory use and safety requirements according to the approved tests usually carried out (acetone porosity, high-temperature test, and flashback test according to the ISO 3901-1:2000 standard).

Example 2

Mechanical Strength Test

The cylinders produced in Example 1 were cut transversely. No cracking of the packing structure was observed.

The latter was then subjected to a compressive strength test. To do this, a cube measuring 100×100 $mm^2$ was removed from the packing structure and a force was applied to the top face of the latter, while it was held against a horizontal metal plate. The force corresponding to the pressure (in kg/$cm^2$ or MPa) above which the material started to crack was recorded. This value, which was 27 kg/$cm^2$ (2.7 MPa) corresponds to the compressive strength of the material, complying with the necessary requirements of integrity over time (durability) and safety.

Example 3

Structural Characteristics of the Packing Structure

The packing structure removed after cutting the cylinders of Example 1 was analyzed by scanning electron microscopy.

These analyses showed that the structure had a microstructural architecture consisting of needles having a length of 3 to 6 μm and a thickness of 0.2 to 0.6 μm. These needles are illustrated in FIG. 1.

This structure had a porosity, measured by mercury porosimetry, of 85-88% by volume, with a monomodal pore size distribution ($D_{50}$=0.55 μm).

Example 4

Withdrawal Test

The cylinders manufactured as described in Example 1 were filled with acetone and then with acetylene with a fill factor of 0.524, that is to say with 0.888 kg of gas in total (including the amount of saturation gas in the solvent and the amount of useful gas) to 1.694 kg of solvent.

Flow tests were then carried out, by withdrawing the gas and regulating it to a continuous flow rate of 400 l/h at an ambient temperature of 18° C. These tests showed that this flow rate could be maintained for 45 min, which corresponded to a degree of gas recovery of more than 37%. The final outside temperature of the cylinder was 11° C., measured on its external wall by means of a thermocouple.

Furthermore, no solvent spitting was observed.

Example 5

Comparison Between Various Packing Structures

Two cylinders having a water volume of 5.8 liters were prepared as described in Example 1 from a slurry comprising 86 kg of quicklime; 90.1 kg of silica; 630 kg of water and 12.4 kg of glass fiber, said slurry undergoing a hydrothermal synthesis operation at 160° C. (cylinder A) or 196° C. (cylinder B) for 50 h under an average pressure of 14 bar over the duration of the hydrothermal synthesis, and then being dried at 350° C. (cylinder A) or 370° C. (cylinder B) for 100 h.

The cylinders were packed with the same amount of the same slurry and differed only by the hydrothermal synthesis and drying temperatures. The porous masses obtained had the same total pore volume (83-84%).

Figure 2A:
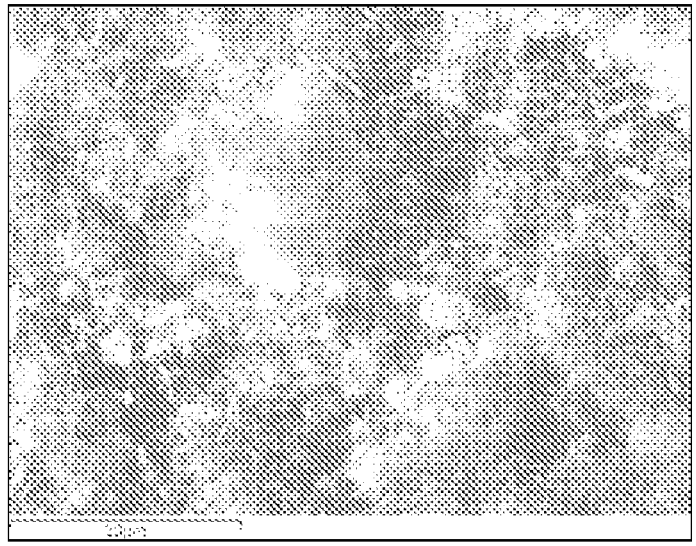
FIGS. 2A to 2C illustrate, at different magnifications, the appearance of a packing structure according to the prior art.
Figure 2B:
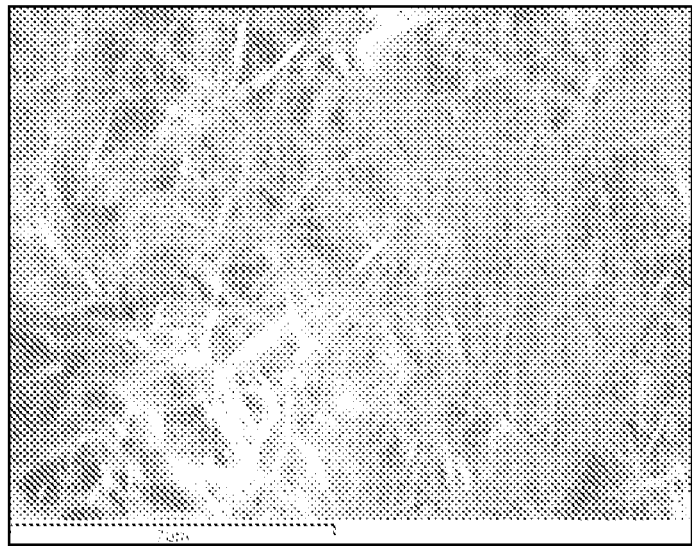
Figure 2C:
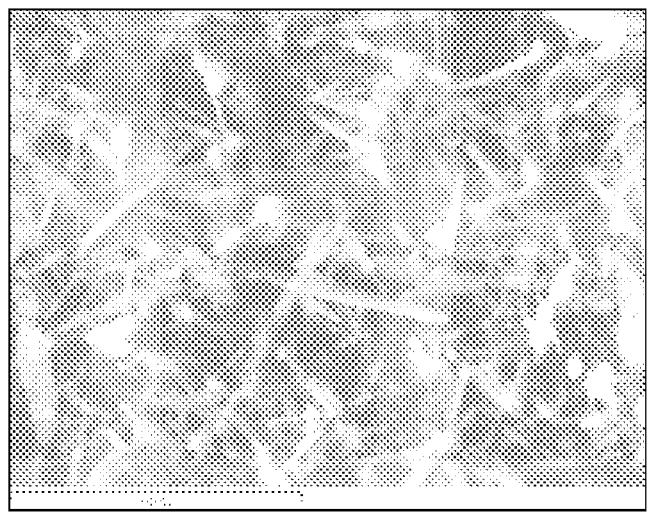
Figure 3A:
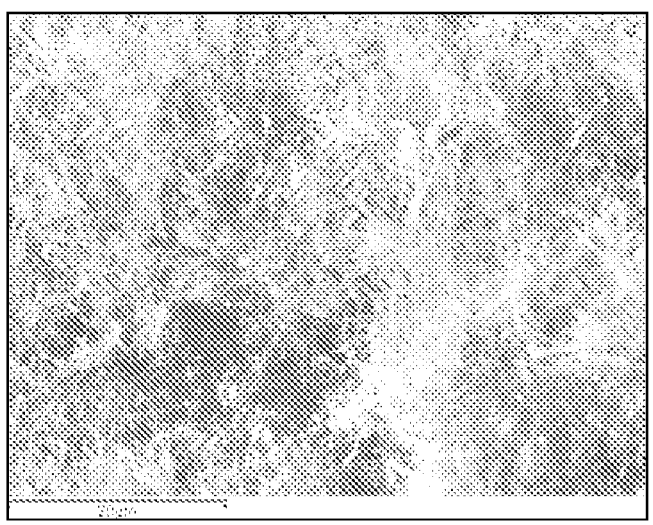
FIGS. 3A to 3C illustrate, at the same magnifications, the appearance of a packing structure according to the invention
Figure 3B:
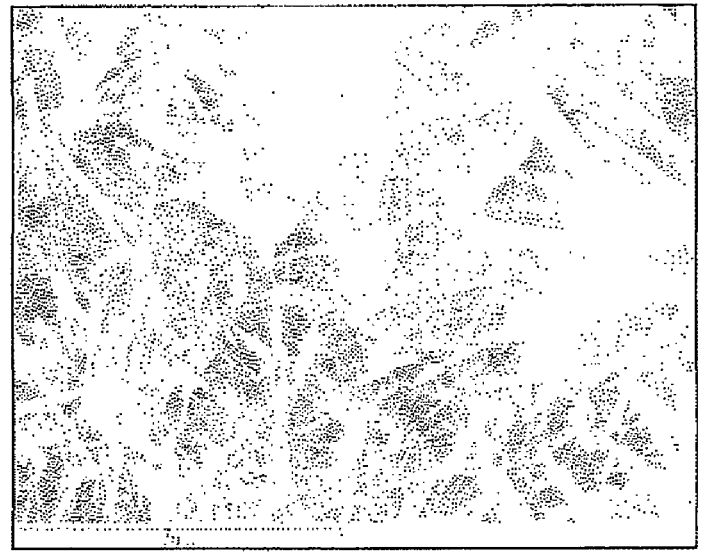
Figure 3C:

The packing structure of cylinder A, observed in scanning electron microscopy, was as illustrated in FIGS. 2A to 2C, whereas that of cylinder B was as illustrated in FIGS. 3A to 3C. They were in the form of needles having the dimensions indicated in Table 2 below.

TABLE 2

Dimensions of the Needles in the Packing Structures
Dimensions of the crystallites remote from the glass fibers:

|  | Cylinder A | | | Cylinder B | | |
|---|---|---|---|---|---|---|
|  | Diameter | Length | Proportion | Diameter | Length | Proportion |
| "Thin" needles | 0.1 μm | 1 μm | ~70% | 0.1 μm | 1.5 μm | ~30% |
| "Thick" needles | 0.2 μm | 1.5 μm | ~30% | 0.3 μm | 4.5 μm | ~70% |

From this table, it is clear that the packing structure of cylinder A had a finer overall microstructure than that of cylinder B, with overall shorter and thinner needles.

Cylinders A and B were then filled with acetylene dissolved in the same solvent and the flow performance of the two cylinders compared, by withdrawing 400 l/h of gas dissolved at various temperatures. The results of these tests are given in Table 3 below.

TABLE 3

Withdrawal Tests

| Type of cylinder | Flow Hold Time | | | | |
|---|---|---|---|---|---|
|  | For 100% contained gas | | For 50% contained gas | | For 38% contained gas |
|  | A 20° C. | A 5° C. | A 20° C. | A 5° C. | A 20° C. |
| A | 19 min | 13 min | 9 min | 4 min | 6.5 min |
| B | 54 min | 138 min | 25 min | 13 min | 19 min |

This table shows that the gas withdrawal flow from cylinder A was exhausted more quickly than from cylinder B, under each condition tested. Furthermore, the degree of recovery at 20° C. (% gas recovered per 100% of gas stored initially) was only 15% in the case of cylinder A, whereas it reached 45% in the case of cylinder B. This better performance of cylinder B according to the invention is linked to the characteristics of the porosity defined by the particular morphology, the size and the arrangement of the xonotlite/tobermorite needles constituting its packing, which characteristics are favorable to the flow of the gas.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A packing structure for containers, wherein it comprises a material of xonotlite and/or tobermorite and/or foshagite crystal structure crystallized in the form of needles, at least 50% by volume of which have a length ranging from 2 to 10 μm and a thickness ranging from 0.2 to 1 μm, said needles being linked together so as to constitute between them pores having a pore diameter $D_{95}$ greater than or equal to 0.4 μm but less than 5 μm and a mean pore diameter $D_{50}$ greater than or equal to 0.4 μm but less than 1.5 μm.

2. The packing structure of claim 1, wherein said needles have a length ranging from 2 to 5 μm.

3. The packing structure of claim 1, wherein said needles have a thickness ranging from 0.2 to 0.5 μm.

4. The packing structure of claim 1, wherein it furthermore includes needles having a length ranging from 0.5 to less than 2 μm and a thickness ranging from 0.01 to less than 0.2 μm.

5. The packing structure of claim 1, wherein it comprises at least 70% by weight of xonotlite and/or tobermorite and/or foshagite.

6. The packing structure of claim 1, wherein it furthermore includes carbon fibers and/or glass fibers and/or cellulose fibers.

7. A process for manufacturing the packing structure of claim 1, the process comprising the following successive steps:
   a) calcining limestone blocks at a temperature of at least 850° C. for at least one hour in order to obtain quicklime particles, wherein 90% of the total weight of the limestone blocks is in the form of limestone blocks having dimensions of 0.1 to 15 mm, and wherein said limestone blocks have a purity of at least 92% limestone by weight and an open porosity ranging from 0 to 25%,
   b) said particles are mixed, in aqueous medium, with silica and optionally with other compounds, in order to obtain a slurry;
   c) said slurry undergoes a hydrothermal synthesis operation at a temperature ranging from 170 to 300° C. in order to obtain a ceramic mass; and
   d) said ceramic mass is dried at a temperature of 300 to 450° C. for a time of 40 to 200 hours.

8. The process of claim 7, wherein at least 90% by weight of said limestone blocks have a size of 1 to 12 mm.

9. The process of claim 7, wherein said limestone has a purity of at least 95% by weight.

10. The process of claim 7, wherein said limestone has an open porosity of between 5 and 25%.

11. The process of claim 7, wherein the hydrothermal synthesis operation is carried out at a temperature between 180 and 250° C.

12. A container having an interior space, the interior space comprising the packing structure of claim 1, which container has the form of a cylinder capable of containing and delivering a fluid.

13. The container of claim 12, wherein it contains acetylene dissolved in a solvent, in particular DMF or acetone.

* * * * *